United States Patent [19]

Pircher et al.

[11] Patent Number: 4,917,969
[45] Date of Patent: Apr. 17, 1990

[54] PROCESS FOR THE PRODUCTION OF CLAD HOT ROLLED STRIP AND THE RESULTING PRODUCT

[75] Inventors: Hans Pircher, Mülheim; Rudolf Kawalla, Oberhausen; Gerd Sussek, Mülheim; Walter Wilms, Duisburg; Waldemar Wolpert, Dinslaken, all of Fed. Rep. of Germany

[73] Assignee: Thyssen Stahl AG, Duisburg, Fed. Rep. of Germany

[21] Appl. No.: 283,407

[22] Filed: Dec. 12, 1988

[30] Foreign Application Priority Data

Dec. 16, 1987 [DE] Fed. Rep. of Germany ....... 3742539

[51] Int. Cl.$^4$ .................... B32B 15/00; B23H 20/00
[52] U.S. Cl. .................... 428/685; 428/683; 428/682; 428/679; 148/11.5 Q; 228/107; 228/158; 228/231
[58] Field of Search .................... 148/11.5 Q, 12.4 R; 228/107, 158, 231; 428/683, 682, 685, 679

[56] References Cited

U.S. PATENT DOCUMENTS 4,645,720  2/1987  Pircher et al. ................. 148/11.5 Q

FOREIGN PATENT DOCUMENTS 62-124229  6/1987  Japan ................. 148/11.5 Q

*Primary Examiner*—Deborah Yee
*Attorney, Agent, or Firm*—Sprung, Horn, Kramer & Woods

[57] ABSTRACT

The invention comprises a process for the production of clad hot rolled strip. A steel slab as base material is cladded with a layer material of a corrosion-resistnt material. The slab is of a low-alloy steel having a carbon content of up to 0.25% by weight, the layer material preferably is stainless, more particularly a stainless austenitic steel or a wrought alloy on a nickel basis. The steel slab and the layer material are connected by explosive cladding, the resulting composite body being heated to rolling temperature and is subsequently rolled down to one quarter of the initial thickness with a high reduction of pass of phi greater than 0.10 and then rolled to final thickness of the hot rolled strip. The finish rolling temperature is in the range of 900° C. The clad hot rolled strip is subjected to a cooling rate in the core of at least 8° C./s to a cooling temperature of below 650° C. After cooling to this temperature range the clad hot rolled strip is coiled and cooled to room temperature.

18 Claims, 1 Drawing Sheet

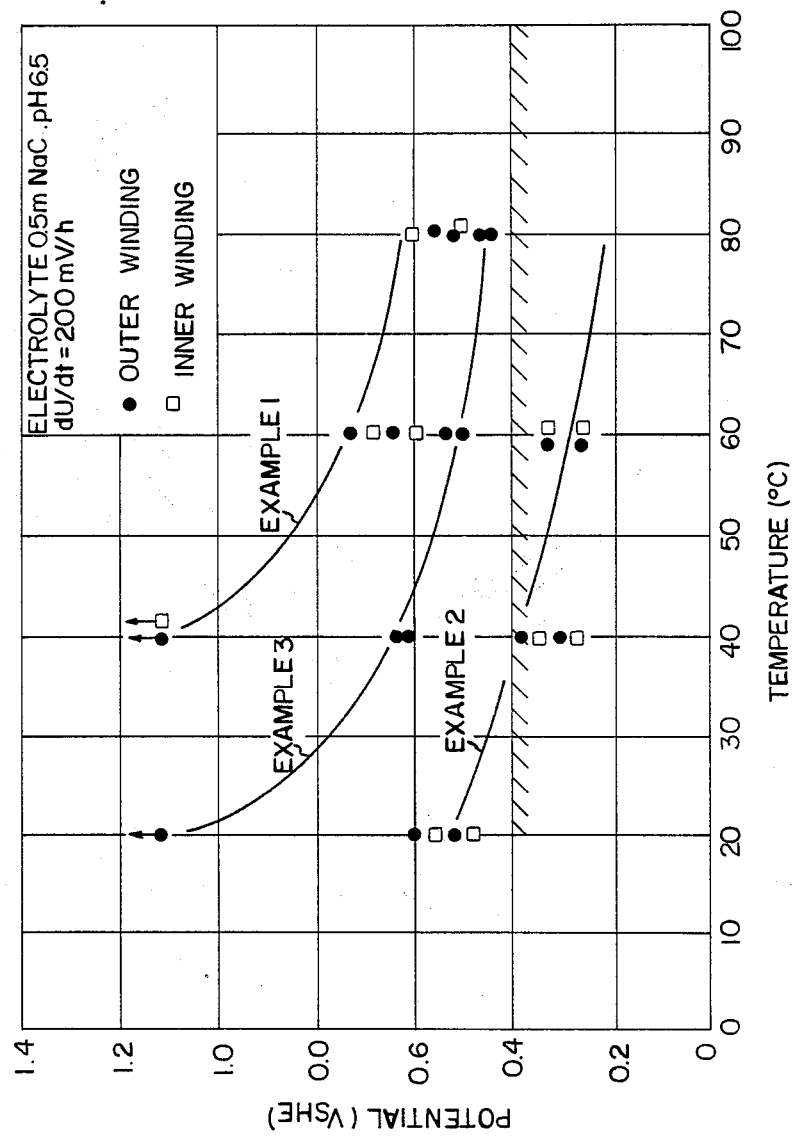
FIG. I

PROCESS FOR THE PRODUCTION OF CLAD HOT ROLLED STRIP AND THE RESULTING PRODUCT

BACKGROUND OF THE INVENTION

The invention relates to a process for the production of clad hot rolled strip, wherein a steel slab as base material is cladded with a corrosion-resistant layer material and the composite body is hot rolled.

Such a process is known f.i. from German patent 1 752 496 according to which, however, the base and layer materials are connected and the hot rolled strip is produced in one manufacturing step, namely in the rolling operation. The rolling operation is performed in a planetary mill, in which the thickness of the cladding assembly consisting of the base and layer materials is isothermally reduced in one pass at over 80% reduction rate to final strip thickness.

The cladding assembly comprises two outer plates, for example, of unalloyed steel or mild steel, which form the base material. Disposed between these plates are two relatively thin plates, for example, of chromium-containing steel as the layer material, these plates being separated from one another by a thin, uniform layer of a separating agent. The cladding assembly thus formed is heated in a non-oxidizing atmosphere in a slab furnace to a hot rolling temperature of, for example, 950° to 1050° C. and then introduced by transport rollers into the planetary mill. To facilitate the handling of the cladding assembly and prevent the plates from becoming separated, the outer plates can be welded along its edges. The strip emerging from the planetary mill can be separated by cutting off the edges into two individual composite metal strips each containing the base material and the layer material of stainless steel.

The external layers of the base material of the composite metal strip can be provided with a coating metal, such as tin, zinc, cadmium, aluminum or other alloys. Furthermore, the composite metal strip can be subjected to a cold rolling treatment by another process.

This prior art process for the production of clad hot rolled strip has the following disadvantages:
- it requires special rolling mills, specially adapted to cladding rolling;
- it presumes the rolling out of double assemblies and has limitations as regards to total thickness of reduction, due to the separating layer;
- as a result of the comparatively low rolling speeds of the planetary mill (maximum 2.4 m/s) the strip temperature decreases over the strip length;
- the properties profile of the strip material must be adjusted in a separate thermal treatment process;
- due to the thermal treatment process to adjust the mechanical and chemical corrosion properties, carburization reactions take place in the bonding zone between the base and the layer materials.

In the production of clad plate it is known to connect the base material of fine-grained structural steels and the layer material of corrosion-resistant materials to one another by an explosion cladding operation. The resulting composite body is rolled out in a plate rolling mill (German Journals "Bänder, Bleche, Rohre" 11, 1982, pages 324 to 328 and "Stahl and Eisen", 102, 1982, No. 12, pages 619 to 624, German Offenlegungsschrift 1 237 787, Japanese Publication "Nippon Kokan Technical Report Overseas", No. 49, 1987, p. 10–18).

However, in the production of clad plate the hot rolling operation must be followed by thermal treatment of the clad plate, to adjust the mechanical properties of the base material and improve the corrosion resistance of the layer material. During this thermal treatment carbon diffuses out of the base material into the layer material. In the carburized zones of the layer material any carbide formation has an adverse effect on the corrosion resistance of the layer material.

However, cladded products in the form of strip are increasingly required, for example, for the production of clad tubes, more particularly sourgas tubes, or as a semi-finished product for cold rolled strip production.

The use of heavy clad plates for these applications is disadvantageous, since individual plates cannot be used for the production of pipes on continuous rolling mills, e.g., for pipe welding installations with high frequency induction or for spiral pipe welding installations; moreover, single plates are unsuitable semi-finished products for cold rolled strip production.

It is therefore an object of the invention to provide a process by which the clad hot rolled strip has outstanding properties of strength and toughness in the rolled condition and by which there is no need for any subsequent thermal treatment of the hot rolled strip to improve the corrosion resistance of the cladding.

DESCRIPTION OF THE INVENTION

According to the invention this problem is solved in that the base material and the layer material are connected to one another by explosive cladding and the resulting composite body is heated to rolling temperature and then hot rolled to final thickness of the hot rolled strip with a high reduction of pass in one operation in a hot strip mill, the hot rolled strip being cooled rapidly from the finish rolling temperaure to the coiling temperature and then coiled.

Preferably the steel slab used is a low-alloy steel (base material) having a carbon content of up to 0.25% by weight, the layer material used being stainless, more particularly an austenitic stainless steel or a wrought alloy on nickel basis.

The composite body heated to rolling temperature is advantageously rolled to one quarter of the initial thickness with a reduction per pass of phi greater than 0.10. Thereafter finish rolling is performed to the final thickness of the hot rolled strip, and the clad hot rolled strip is cooled at a rate in the core of at least 8° C./s to a cooling temperature of below 650° C.

The reduction per pass phi is defined as $$\text{phi} = \ln \frac{h_{n-1}}{h_n}$$

with $h_n$ = thickness of the rolled piece after the nth pass and $h_{n-1}$ = thickness of the rolled piece after the (n−1)th pass.

In comparison with the prior art processes for the production of clad hot rolled strip it is an essential feataure of the invention that the base material and the layer material are connected to one another by explosive cladding, and that the resulting composite body is hot rolled first to one quarter of the initial thickness not in a planetary mill, but in a hot rolling mill with a high reduction per pass, preferably of phi greater than 0.10, and thereafter finish rolling is performed to strip dimension.

Another essential feature of the invention is that immediately afterwards—that means in one operation—the hot rolled strip produced is subjected to a rapid cooling preferably with a cooling rate in the core of at least 8° C./s. After the rapid cooling to below 650° C., the clad hot rolled strip is coiled and air cooled to room temperature.

The clad hot rolled strip can be used without further processing steps for various applications, more particularly for the production of tubes and as a semi-finished product for cold rolled strip production.

The rolling and cooling conditions are of special importance. For example, the initial rolling of the composite body to one quarter of its inital thickness with a high reduction per pass of phi greater than 0.10 contributes to a rapid and complete recrystallization of the layer material during the first passes. Recrystallization during initial rolling produces a uniform, fine grained structure on the layer side. This obviates the risk of bursting in the finishing roll stands, where recrystallization processes can take place in the cladding material only with difficulty, due to lower temperatures.

The step according to the invention of cooling the clad hot rolled strip at a rate in the core of at least 8° C./s advantageously influences the strength properties of the base material and prevents the formation of precipitations during the cooling of the rolled strip on the layer side, which would cause reduced resistance to corrosion. Moreover the diffusion of carbon from the base material into the layer material, resulting in disadvantageous carbide formations, is substantially avoided.

Prior to hot rolling in the hot strip mill, the composite body is preferably heated to a temperature in the range of 1200° to 1280° C. The preferred range of the finish rolling temperature is above 900° C., more particularly 950° to 1100° C. As a result, at the start of the rolling operation the composite material is free from precipitations on the bonding side. These two steps can also have a favourable effect on the forming behaviour, thus preventing the edges of the surfaces of the layer material from bursting. The high finish rolling temperature also prevents the formation of precipitations which might have an adverse effect on the corrosion resistance of the clad strip.

According to another feature of the invention, after leaving the finishing train of the hot strip mill the clad hot rolled strip is cooled with liquid and/or gaseous coolants, such as water or mixtures of water and air, at a cooling rate in the core of 10° to 55° C./s. The result is that the formation of disadvantageous precipitations in the cladding strip are prevented during the cooling phase of the hot rolled strip and a fine grained structure having advantageous manufacturing and service properties is obtained in the base material.

The temperature to which the clad hot rolled strip is first cooled should be preferably in the range of below 650° to 500° C. This step contributes towards enabling the clad hot rolled strip to be used after coiling and cooling to room temperature without subsequent solution annealing.

When a hot strip mill having a reversing roughing stand is used, rolling can be performed substantially without holding times between the reversing steps, to keep the cooling of the composite body as low as possible during reduction thereby, as already stated, encouraging rapid and complete recrystallization in the layer material.

For the base material a steel having the following composition (in % by weight) can be used:
0.02–0.25% carbon
up to 2.5% manganese
up to 0.06% aluminum
up to 0.8% silicon
rest iron and unavoidable impurities.

It has been found that inspite of the high finish rolling temperature, such a steel is suitable for the production of clad hot rolled strip with good properties. Moreover, this steel can be thermally cut and welded by established techniques without problems.

The steel used for the base material may also contain (in % by weight) at least one of the following elements:
up to 0.1% niobium (columbium)
up to 0.25% titanium
up to 0.7% molybdenum
up to 1.0% chromium
up to 1.0% nickel
up to 0.5% copper
up to 0.15% vanadium These additions further improve the manufacturing and service properties.

The layer material may be austenitic stainless steel containing (in % by weight):
max. 0.1% carbon
max. 4% manganese
max. 4% silicon
max. 35% nickel
10–30% chromium
max. 7% molybdenum
rest iron and unavoidable impurities.

The limitation of the carbon content reduces the tendency of forming precipitations.

It has also been found to be advantageous if an austenitic stainless steel used as the layer material contains in addition at least one of the following elements (in % by weight):
max. 1.5% titanium
max. 1.5% niobium (columbium)
max. 5% copper
max. 0.5% aluminum
max. 0,5% nitrogen.

However, the layer material can also advantageously be a wrought alloy on a nickel basis containing (in % by weight):
max. 0.1% carbon
max. 4% manganese
max. 4% silicon
max. 45% iron
10–30% chromium
max. 10% molybdenum
rest nickel and unavoidable impurities.

A wrought alloy of this kind is useful for applications which necessitate very good resistance to corrosion both at room temperature and elevated temperatures.

The wrought alloy may further contain at least one of the following elements (in % by weight):
max. 1.5% titanium
max. 1.5% niobium (columbium)
max. 5% copper
max. 0.5% aluminum
max. 0.5% nitrogen The advantages of the process according to the invention over rolling in a planetary mill are:
existing conventional hot strip mill can be used;
hot rolling of an explosion clad semi-finished product
  eliminates the limitations in total reduction ratio mentioned above in connection with double clad assemblies, the result being manufacturing possibilities for a clad strip manufacturing programme which is wide as regards combination of materials, strip thickness and coil weight;

the strip temperature can be kept uniform in hot strip mills, due to the high rolling speeds controllable with the strip length;

the properties profile of the strip material can be adjusted by a special combination of heating temperature, forming conditions and cooling immediately after the material leaves the last rolling stand, so that there is no need for a further thermal treatment.

The advantages of the process according to the invention over the production of clad plate are:

the clad hot rolled strip is suitable for further processing on continuous manufactoring lines, for example, in the production of tubes or for cold rolling;

hot strip rolling allows the economical manufacture of large-size thin claddings with a close tolerance, resulting also in economic advantages for further processing;

carburization reactions of the cladding are so limited as to be negligible in comparison with cladding by conventional rolling and thermal treatment.

BRIEF DESCRIPTION OF DRAWING

FIG. 1 is a graph showing the results of corrosion test of three different layer materials.

EXAMPLES

The invention will now be further described and explained in relation to embodiments thereof;

EXAMPLE 1

The base material used for the clad hot rolled strip to be produced was a 120 mm thick slab of a low-alloy fine grained structural steel. The layer material used being a 40 mm thick semi-finished product of a stainless austenitic alloy (X 1 NiCrMoCu 31 27, material no. 1.4563). The chemical composition of the two steels is given in Table 1.

A composite body was produced from the base material and the layer material by explosive cladding. The composite body was heated to 1250° C. in a pusher type furnace and then rolled with 20-fold reduction in a hot strip mill into a clad hot rolled strip having a total thickness of 8 mm (6 mm basic material, 2 mm layer material) in the following steps:

After a first skin passing the composite body was hot rolled from the initial thickness of 160 mm to 35 mm in a first group of the hot strip mill stands with a high reduction per pass of phi greater than 0.10 and with a rapid succession of passes, the temperature being than about 1090° C.

The composite body was then further hot rolled into hot rolled strip in the finishing train of the hot strip mill with the usual rolling parameters. The finish rolling temperature was about 980° C.

After leaving the finishing train of the hot strip mill the clad hot rolled strip was cooled over a hot strip cooling system to 550° C., the cooling rate in the core being about 20° C./s.

The clad hot rolled strip was then coiled at about 550° C. and the coil was finally cooled in air to room temperature.

Investigations of the clad hot rolled strip comprised to the following properties:

1. Cladding adhesion and hardness;
2. Mechanical properties (yield strength, tensile strength, elongation, reduction in area and notch toughness);
3. Pitting corrosion tests relating to intercrystalline and uniform corrosion.

1. Cladding Adhesion and Hardness

Cladding adhesion was tested by shearing and bending tests and the hardness tests according to Vickers (HV). Table 2 presents shear strength and hardness as tests results. In the as-rolled condition the shear values are over 400 N/mm$^2$, thereby indicating excellent cladding adhesion.

The bending tests (tensile zone in the base material tensile zone in the layer material) never showed detachments or cracks in the bonding area up to a mandrel diameter of D=2a (a—strip thickness).

The hardness test results of Examples 1 and 2 show, that the hardness values HV10 for the outer and inner winding of the coil, investigated for the base material and the layer material are nearly equal, that means nearly equal hardness and strength values over the whole length of the clad strip.

2. Mechanical Properties

The mechanical properties are listed in Table 3. In the as-rolled condition the clad hot rolled strip meets the demands of the strength requirements according to API 5L X 65 (Amer. Petrol. Inst., 5L=tube steels, X 65=65 Kpsi corresponding to 448 N/mm$^2$ minimum yield strength) and has very satisfactory toughness. On 6 mm samples of the base material, notch toughness still reaches values over 70 J at −40° C.

3. Corrosion Tests

These tests were carried out by pickling as well as grinding the rolling skin. The corrosion tests were performed using the Streicher test to Stahleisen Test Sheet 1877 and the Huey test to Stahleisen Test Sheet 1870. The results of the pitting corrosion tests are shown in FIG. 1. In samples of the outer and inner winding the layer material showed pitting potentials comparable with solid material in both the pickled and the ground condition. The same positive results were achieved in the Streicher and Huey tests.

EXAMPLE 2

The base material used for the clad hot rolled strip to be produced was a slab of the same steel grade and size as in Example 1. The layer material used was a 40 mm thick plate of an austenitic steel alloy (X 2 CrNiMo 17 13 2, material no. 1.4404), the chemical composition of which is given in Table 1. The explosion cladding of the composite material, heating, rolling, cooling and the investigations of the properties in the as-rolled condition were carried out as in Example 1.

The results of the shearing strength and hardness tests are given in Table 2 and those of the mechanical properties in Table 3. Clearly, a repeatable properties profile of the strength stage according to API 5L X 65 was achieved under the same production conditions.

The results of the pitting tests are shown in FIG. 1. surface-related mass loss rates comparable with solid material were determined in the Streicher test and Huey test respectively.

EXAMPLE 3

The base material used for the clad hot rolled strip to be produced was a 145 mm slab of a fine grained structural steel, the layer material being a 36 mm thick plate rolled from a nickel base alloy (NiCr 21 Mo, DIN material No. 2.4858). The chemical compositions of both alloys are given in Table 1.

A hot rolled strip was produced with a total final thickness of 10 mm (8 mm material, 2 mm layer material). Explosive cladding, heating, hot rolling, cooling and the investigations of the properties in the as-rolled condition were performed as in the Example 1.

The results of the mechanical tests are listed in Tables 2 and 3. Strength and toughness properties were achieved which corresponded to line pipe quality API 5L X 70. The results of the corrosion tests (FIG. 1) show a properties profile corresponding to that of the layer material.

The results indicate that the clad hot rolled strip produced by the process according to the invention can be applied for the production of tubes and for other purposes in which clad strips are processed in thin dimensional ranges.

We claim:

1. A process for the production of a clad hot rolled strip, comprising (a) cladding a steel slab as a base material with a corrosion-resistant cladding material as a layer material by explosive cladding, (b) heating the resulting composite body from (a) to a rolling temperature, (c) hot-rolling the composite body from (b) to a final thickness of the hot rolled strip with a high reduction of pass in one operation in a hot strip mill, (d) rapidly cooling the resulting hot rolled strip from a finish rolling temperature to a cooling temperature and (e) coiling the cooled strip.

2. A process according to claim 1 wherein prior to hot rolling the composite body is heated to a temperature in the range of 1200° to 1280° C.

3. A process according to claim 1 wherein the composite body after heating to rolling temperature is hot rolled to ¼ of the initial thickness with a reduction per pass of phi greater than 0.10 and then further hot rolled to the final thickness of the hot rolled strip.

4. A process according to claim 1 wherein the finish temperature of the hot rolling is in the range of above 900° C.

5. A process according to claim 4 wherein the finish temperature of the hot rolling is in the range of 950° to 1100° C.

6. A process according to claim 1 wherein the cooling of the hot rolled strip from the finish temperature of the hot rolling is performed with a cooling rate in the core of at least 8° C./s.

TABLE 1

| | | Chemical Composition % by weight | | | | | | | | | | | | |
|---|---|---|---|---|---|---|---|---|---|---|---|---|---|---|
| | Example | C | Si | Mn | P | S | Al | Cu | Cr | Ni | Nb | N | Mo | Ti |
| Layer Material | 1 | .009 | .43 | 1.49 | .016 | .003 | .021 | | 17.01 | 11.13 | | | 2.16 | |
| | 2 | .009 | .02 | 1.52 | .014 | .003 | | 1.23 | 26.7 | 31.2 | | | 3.36 | |
| | 3 | .007 | .34 | .80 | .013 | .005 | .08 | 2.00 | 20.65 | 39.75 | | | 3.05 | .78 |
| Base Material | 1 + 2 | .058 | .42 | .83 | .016 | .001 | .034 | .015 | .029 | .023 | .026 | .0058 | | .018 |
| | 3 | .06 | .32 | .87 | .012 | .005 | .034 | .30 | | .25 | .020 | .007 | | .035 |

TABLE 2

Cladding Adhesion and Hardness Test

| Example | Position | Shearing strength $\tau S$ N/mm$^2$ | Hardness HV 10 layer material | Hardness HV 10 base material |
|---|---|---|---|---|
| 1 | Outer Winding Edge | 440/444 | 260 | 173 |
| | Inner Winding Edge | 443/447 | 294 | 170 |
| 2 | Outer Winding Edge | 453/465 | 233 | 174 |
| | Inner Winding Edge | 451/451 | 236 | 177 |
| 3 | Outer Winding Edge | 307/366 | 215 | 174 |

TABLE 3

Mechanical Properties
API-Sample with layer

| | | | Yield point $R_{p0.2}$ N/mm$^2$ transverse | Tensil strength $R_m$ N/mm$^2$ transverse | Elongation $A_2''$ % transverse | Reduction in area Z % transverse | Notch impact work $A_v$ (ISO-V) J Cross section 0,40 cm$^2$ | | | |
|---|---|---|---|---|---|---|---|---|---|---|
| | | | | | | | +20° C. | | −40° C. | |
| Example | Position | | | | | | longitudinal | transverse | longitudinal | transverse |
| 1 | outer-winding | Edge | 473 | 594 | 34 | 69 | 101/103 | 74/81 | 102/110 | 71/85 |
| | inner-winding | Edge | 487 | 615 | 33.5 | 63 | 92/92 | 87/89 | 90/105 | 80/89 |
| 2 | outer-winding | Edge | 465 | 576 | 38 | 66 | 88/90 | 82/85 | 86/110 | 70/77 |
| | inner-winding | Edge | 467 | 577 | 36 | 69 | 90/92 | 84/87 | 83/97 | 61/79 |
| | | Middle | 468 | 582 | 37 | 66 | 85/94 | 80/90 | 71/72 | 58/70 |
| 3 | outer-winding | Edge | 496 | 634 | 32 | 60 | 60/77 | 64 | 68 | 52 |

*transverse

7. A process according to claim 6 wherein after leaving the finishing train of the hot strip mill the hot rolled strip is cooled with liquid and/or gaseous coolants, such as water or mixtures of water and air, with a cooling rate in the core of 10° to 55° C./s.

8. A process according to claim 6 wherein the hot rolled strip is cooled to a temperature of below 650° C.

9. A process according to claim 8 wherein the hot rolled strip is cooled to a temperature in the range of below 650° to 500° C.

10. A process according to claim 1 wherein the coiled hot rolled strip is cooled to room temperature.

11. A process according to claim 3 wherein the composite body is hot rolled to ¼ of the initial thickness in a reversing roughing stand of the hot strip mill substantially without holding times between the reversing steps and furter hot rolled to final thickness continuously.

12. A product produced by the method according to any of the preceding claims wherein the steel slab (basic material) having a carbon content of up to 0.25% by weight, the layer material being stainless steel, an austenitic stainless steel or a wrought alloy on nickel basis.

13. A product according to claim 12 wherein the base material is a steel containing (in % by weight)
0.02–0.25% carbon
up to 2.5% manganese
up to 0.06% aluminum
up to 0.8% silicon
rest iron and unavoidable impurities.

14. A product according to claim 13, wherein the base material additionally contains at least one of the following elements (in % by weight):
up to 0.1% niobium (columbium)
up to 0.25% titanium
up to 0.7% molybdenum
up to 1.0% chromium
up to 1.0% nickel
up to 0.5% copper
up to 0.15% vanadium.

15. A product according to claim 12 wherein the layer material is an austenitic stainless steel containing (in % by weight):
max. 0.1% carbon
max. 4% manganese
max. 4% silicon
max. 35% nickel
10–30% chromium
max. 7% molybdenum
rest iron and unavoidable impurities.

16. A product according to claim 15 wherein that the austentic stainless steel of the layer material additionally contains at least one of the following elements (in % by weight):
max. 1.5% titanium
max. 1.5% niobium (columbium)
max. 5% copper
max. 0.5% aluminum
max. 0.5% nitrogen.

17. A product according to claim 12 wherein the layer material is a wrought alloy containing:
max. 0.1% carbon
max. 4% manganese
max. 4% silicon
max. 45% iron
10–30% chromium
max. 10% molybdenum
rest nickel and unavoidable impurities.

18. A product according to claim 17 wherein the wrought alloy additionally contains (in % by weight) at least of the following elements:
max. 1.5% titanium
max. 1.5% niobium (columbium)
max. 5% copper
max. 0.5% aluminum
max. 0.5% nitrogen.

* * * * *